(12) United States Patent
Seto

(10) Patent No.: US 10,901,477 B2
(45) Date of Patent: Jan. 26, 2021

(54) INFORMATION PROCESSING APPARATUS AND CONTROLLING METHOD

(71) Applicant: LENOVO (SINGAPORE) PTE. LTD., Singapore (SG)

(72) Inventor: Yuichiro Seto, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/585,878

(22) Filed: Sep. 27, 2019

(65) Prior Publication Data

US 2020/0409443 A1 Dec. 31, 2020

(30) Foreign Application Priority Data

Jun. 27, 2019 (JP) ................................. 2019-119454

(51) Int. Cl.
*G06F 1/32* (2019.01)
*G06F 1/3206* (2019.01)
*G06F 1/3287* (2019.01)

(52) U.S. Cl.
CPC .......... *G06F 1/3206* (2013.01); *G06F 1/3287* (2013.01)

(58) Field of Classification Search
CPC ............................. G06F 1/3206; G06F 1/3287
See application file for complete search history.

(56) References Cited

U.S. PATENT DOCUMENTS

| 6,801,196 B1 * | 10/2004 | Bodley ................. G06F 1/3203 345/211 |
| 2008/0126815 A1 * | 5/2008 | Cantwell ............... G06F 1/3268 713/323 |
| 2020/0319896 A1 * | 10/2020 | Vrabel ...................... G06F 1/08 |

FOREIGN PATENT DOCUMENTS

JP 2011248788 A 12/2011

* cited by examiner

*Primary Examiner* — Stefan Stoynov
(74) *Attorney, Agent, or Firm* — Shimokaji IP

(57) ABSTRACT

An information processing apparatus includes a first controller which is in an active state regardless of whether a state of a computer system is the active state or an idle state and a second controller which is in the active state in a case where the state of the computer system is the active state, a first low power consumption mode or a second low power consumption mode and is in the idle state in a case where the state of the computer system is a third low power consumption mode are provided. The first controller freely counts a time of day and changes the state of the computer system to the first low power consumption mode in a case where the state of the computer system is the third low power consumption mode and the time of day reaches a predetermined transition time of day.

7 Claims, 6 Drawing Sheets

INFORMATION PROCESSING APPARATUS AND CONTROLLING METHOD

FIELD OF THE INVENTION

The present invention relates to an information processing apparatus and a controlling method therefor.

BACKGROUND OF THE INVENTION

A more reduction in power consumption is expected in an information processing apparatus such as a Laptop personal computer (in the following, referred to as a Laptop PC) and so forth. In general, power consumption of a processor occupies most of the power consumption of the information processing apparatus. Accordingly, in a case where an operation status of the processor is detected and the operation status is an idle state, there are cases where the information processing apparatus changes its operation mode from an operation mode (in the following, referred to as a standard operation mode) which is a normal working state to a sleeping mode. The sleeping mode is an operation mode which is lower in power consumption than the standard operation mode and is sometimes called a low power consumption mode, a power saving mode, a standby power source mode, a dormant state and so forth. The sleeping mode includes operation modes which are called the Modern Standby mode and the Hibernation mode in addition to the existing standby mode (the S3 mode). In the Modern Standby mode, although predetermined limited functions such as so-called One Touch Login, data synchronization, voice operation and so forth are provided, an operation according to a user operation is not performed. Then, a resume time (for example, about 1.3 [s]) which is taken for changing from the Modern Standby mode to the standard operation mode is shorter than a resume time (for example, about 3.7 [s]) which is taken for changing from the existing sleeping mode to the standard operation mode. Although the Modern Standby mode is excellent in user experience (UX), the Modern Standby mode is liable to more increase in power consumption than the existing standby mode.

The Hibernation mode is a state where the operation of the processor is stopped after saving various kinds of data that a system memory holds into an external storage device in operation of the processor. There are cases where the Hibernation mode is called the dormant state. In a case of changing the operation mode from the Hibernation mode to the standard operation mode, the processor reads out the various kinds of data which are saved in the external storage device immediately after the operation is started, stores the read-out data into the system memory and thereafter resumes execution of a process which is executed immediately before the operation of the processor is stopped. Although, in the Hibernation mode, the power consumption is lower than power consumption used in the existing sleeping mode, the resume time becomes longer than the resume time of the existing sleeping mode. Accordingly, introduction of a function which is called Smart Standby is proposed. The Smart Standby is the function of setting in advance a daily scheduled use time of the information processing apparatus, changing the operation mode from the Modern Standby mode to the Hibernation mode at the end of the scheduled use time and changing the operation mode from the Hibernation mode to the Modern Standby mode at the start of the next scheduled use time.

For example, an electronic apparatus which is described in Japanese Patent No. 5279762 is equipped with a time counting circuit which generates a calendar time of day of a system, a timer which counts a time, a memory which stores the calendar time of day at which a wake-up event is issued and a processor which outputs the wake-up event at the calendar time of day which is stored on the basis of an elapsed time that the timer counts on the basis of the calendar time of day which is received from the time counting circuit. The electronic apparatus concerned has a battery pack which supplies power to the electronic apparatus and a power source control circuit which is supplied with the power and receives the wake-up event from the battery pack in a power-off state, and then shifts the power-off state to a power-on state.

SUMMARY OF THE INVENTION

However, in the electronic apparatus which is described in Japanese Patent No. 5279762, the time counting circuit and the timer are provided in a PCH (Platform Controller Hub). Therefore, even in a case where the operation of the processor is stopped, it is necessary to supply the power to the PCH. Accordingly, a further reduction in power consumption in an idle term other than the scheduled use time is expected.

The present invention has been made in order to solve the above-described issues. An information processing apparatus according to the first aspect of the present invention includes a computer system which is configured to freely make a transition between an active state and an idle state which is lower than the active state in power consumption and is a power mode of at least any one of a first low power consumption mode, a second low power consumption mode which is longer than the first low power consumption mode in resume time taken for returning to the active state and a third low power consumption mode which is lower than the second low power consumption mode in power consumption, in which the computer system includes a first controller which is in an active state regardless of whether a state of the computer system is the active state or the idle state, and a second controller which is in an active state in a case where the state of the computer system is the active state, the first low power consumption mode or the second low power consumption mode and is in an idle state in a case where the state of the computer system is the third low power consumption mode, and the first controller is configured to freely count a first time of day and change the state of the computer system to the first low power consumption mode in a case where the state of the computer system is the third low power consumption mode and the first time of day reaches a predetermined first transition time of day.

In the above-described information processing apparatus, the second controller may be configured to freely count a second time of day independently of the first time of day, use the second time of day as a control base time which is a time of day used to control the state of the computer system, and in a case where the state of the computer system transitions from the first low power consumption mode to the second low power consumption mode, change the control base time from the second time of day to the first time of day and thereafter change the state of the computer system to the third low power consumption mode.

In the above-described information processing apparatus, the second low power consumption mode and the third low power consumption mode may be operation modes that an operation of a processor that the computer system has stops respectively.

In the above-described information processing apparatus, the second controller may be configured to control input and output of data using other devices, and the first low power consumption mode may be an operation mode that the second controller freely inputs and outputs the data.

In the above-described information processing apparatus, the first controller may start up the second controller in a case where the first time of day reaches a predetermined second transition time of day which is different from the first transition time of day, and the second controller may start up the processor after completion of its own start-up.

In the above-described information processing apparatus, the second controller may be configured to freely control data input and output which is faster than data input and output by the first controller.

A controlling method according to the second aspect of the present invention is the controlling method of the information processing apparatus which includes a computer system which is configured to freely make a transition between an active state and an idle state which is lower than the active state in power consumption and is a power mode of at least any one of a first low power consumption mode, a second low power consumption mode which is longer than the first low power consumption mode in resume time taken for returning to the active state and a third low power consumption mode which is lower than the second low power consumption mode in power consumption, in which the computer system includes a first controller which is in an active state regardless of whether a state of the computer system is the active state or the idle state and a second controller which is in an active state in a case where the state of the computer system is the active state, the first low power consumption mode or the second low power consumption mode and is in an idle state in a case where the state of the computer system is the third low power consumption mode, the method including the step of changing the state of the computer system to the first low power consumption mode by the first controller in a case where the state of the computer system is the third low power consumption mode and a time of day that the first controller counts reaches a predetermined transition time of day.

The above-described aspects of the present invention can reduce the power consumption in the idle term.

DETAILED DESCRIPTION OF THE INVENTION

First, a hardware configuration example of an information processing apparatus 1 according to one embodiment of the present invention will be described with reference to the drawings. Although, in the following description, a case where the information processing apparatus 1 is mainly a Laptop PC is exemplified, the information processing apparatus 1 is not limited to the Laptop PC. The information processing apparatus 1 may be realized in any form such as a desktop PC, a tablet terminal device, a smartphone and so forth.

Figure 1:
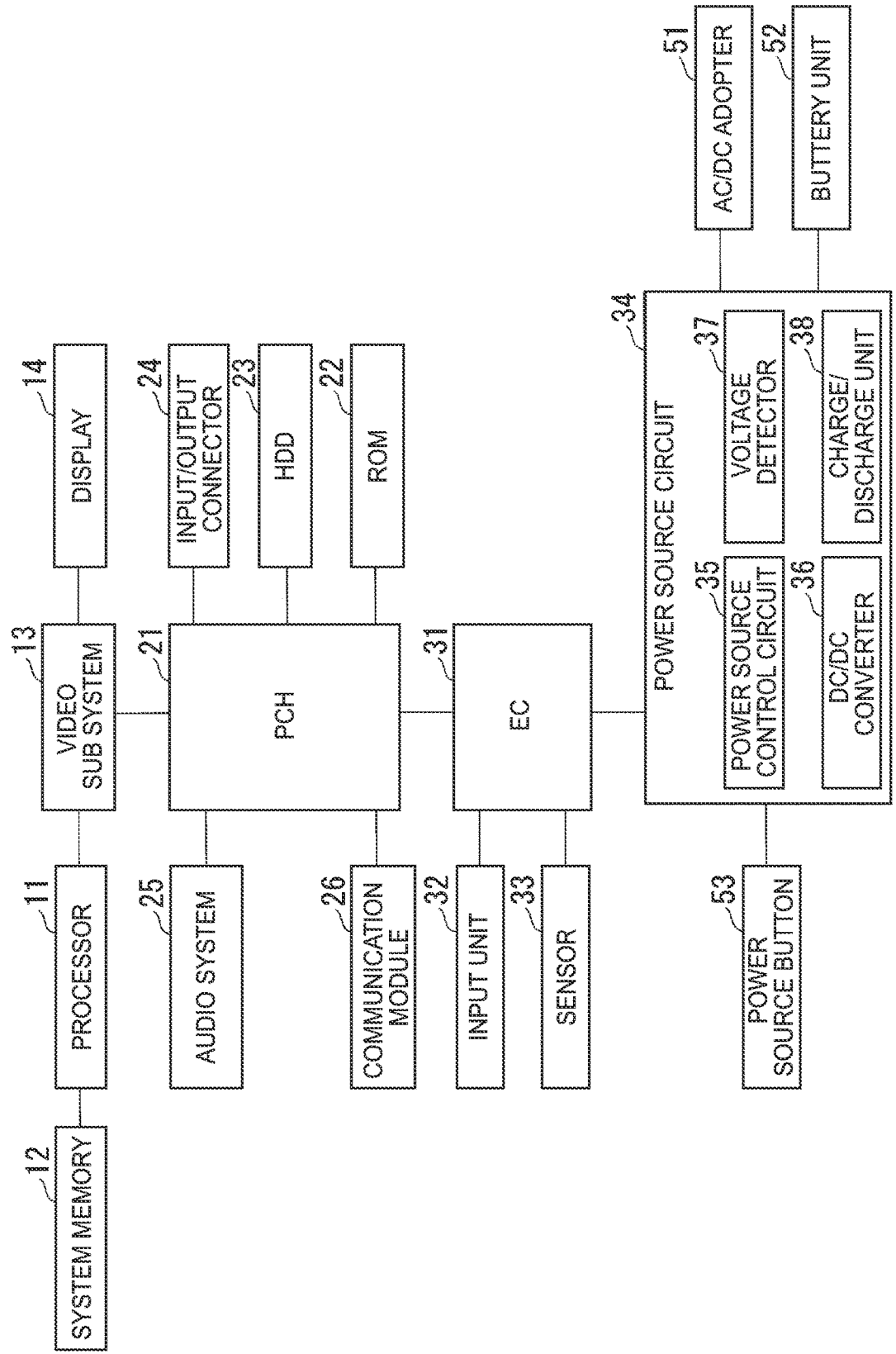
FIG. 1 is a schematic block diagram illustrating one configuration example of hardware of an information processing apparatus according to one embodiment of the present invention.

FIG. 1 is a schematic block diagram illustrating one configuration example of hardware of the information processing apparatus 1 according to the present embodiment.

The information processing apparatus 1 is configured by including a processor 11, a system memory 12, a video sub system 13, a display 14, a PCH 21, a ROM (Read Only Memory) 22, an HDD (Hard Disk Drive) 23, an input/output connector 24, an audio system 25, a communication module 26, an EC (Embedded Controller) 31, an input unit 32, a sensor 33 and a power source circuit 34. In another viewpoint, the information processing apparatus 1 is equipped with a computer system and the computer system is configured by including, at least, the processor 11, the system memory 12, the PCH 21 and the EC 31.

The processor 11 executes various kinds of arithmetic processing under program control and controls the operation of the entire information processing apparatus 1. The processor 11 is configured by, for example, one, two or more CPU(s) (Central Processing Unit).

The system memory 12 is a writable memory which is utilized as a read-in area for a program that the processor 11 executes or a writing work area for processing data which is generated by executing the program. The system memory 12 is configured by including, for example, one, two or more DRAM (Dynamic Random Access Memory) chip(s). An execution program includes, for example, OS (Operating System), a driver which is used to control operations of peripherals, various service/utility programs (in the following, abbreviated as "utility"), an application program (in the following, abbreviated as "app") and so forth. Incidentally, in the present application, "to execute a program" includes the meaning that a process which is directed with a command which is described in the program concerned is executed.

The video sub system 13 is a sub system which is adapted to realize a function relating to image display. The video sub system 13 is configured by including a video controller. The video controller executes a process which is directed with a drawing command which is input from the CPU 11 and writes display data which is obtained by execution of the process into a video memory that the video controller itself has. The video controller reads the written display data out of the video memory and outputs the read-out display data to the display 14.

The display 14 displays an image which is based on the display data which is input from the video sub system 13. The display 14 may be any of, for example, an LCD (Liquid Crystal Display), an OLED (Organic Light Emitting Diode Display) and so forth.

The PCH 21 controls input and output of various kinds of data using a peripheral input/output device. The PCH 21 includes interfaces such as, for example, a USB (Universal Serial Bus), a serial ATA (Advanced Technology Attachment) bus, an SPI (Serial Peripheral Interface) bus, a PCI (Peripheral Component Interconnect) bus, a PCI-Express bus, an LPC (Low Pin Count) bus and so forth and it is possible to connect devices which cope with the above-described buses to the PCH 21. In the example illustrated in FIG. 1, the ROM 22, the HDD 23, the input/output connector 24, the audio system 25 and the communication module 26 are connected to the PCH 21.

Incidentally, the PCH 21 includes a mode control section 252 (FIG. 2) which is adapted to control an operation state of the computer system in accordance with an operating environment, a time counting section 255 (FIG. 2) which is adapted to control an operation of the mode control section 252 and an oscillation section 254 (FIG. 2) which is adapted to drive the time counting section 255. Accurate date and time management is requested to the PCH 21 over a long period of time regardless of whether network connection is present and therefore a high accuracy is necessary for a time of day that the time counting section 255 counts. The oscillation section 254 is, for example, a liquid crystal oscillator. The time counting section 255 is, for example, an RTC (Real Time Clock). The PCH 21 uses the time of day that the time counting section 255 counts and a clock signal that the oscillation section 254 generates for control of data input/output into/from the devices which are connected to the PCH 21.

The ROM 22 is configured by including an electrically rewritable nonvolatile memory. For example, a BIOS (Basic Input Output System), system firmware used to control the operations of the EC 31 and other devices and so forth are stored in the ROM 22.

Various programs which are executed by the processor 11 and various kinds of data are stored in the HDD 23.

The input/output connector 24 is configured by including a terminal which establishes wired connection with other apparatuses so as to make input and output of various kinds of data possible. The input/output connector 24 is, for example, a USB connector which is adapted to establish connection conforming to the USB (Universal Serial Bus) standard.

The audio system 25 inputs and outputs voice data. The audio system 25 is configured by including, for example, a loudspeaker which reproduces a voice according to the voice data which is input into the loudspeaker itself and a microphone which acquires the voice data by collecting sounds which arrive at the microphone itself.

The communication module 26 is connected to a network by wires or wirelessly and performs transmission and reception (communication) of various kinds of data with other apparatuses which are connected to the network. The communication module 26 is, for example, a WLAN (Wireless Local Area Network) card.

The EC 31 monitors the operating environment of the information processing apparatus 1 independently of the processor 11 and the PCH 21 and controls operations of various devices of the information processing apparatus 1. More specifically, the EC 31 has a power source management function for controlling the operation of the power source circuit 34, various input and output terminals (not illustrated) and a time counting section 155 (will be described later). The input unit 32, the sensor 33 and the power source circuit 34 are connected to the EC 31 via the input and output terminals that the EC 31 itself includes so as to control the operation of the power source circuit 34.

The EC 31 is configured as, for example, a microcomputer which includes original processor and storage unit.

Incidentally, since long-term accurate date and time management is not requested to the EC 31, the time of day that the time counting section 155 counts is not requested to have an accuracy which is as high as the accuracy which is requested to the time counting section 255 that the PCH 21 includes. The time counting section 155 is, for example, the RTC.

The EC 31 detects the operating environment and a change of the operating environment which serve as triggers for controlling the operation mode of the information processing apparatus 1 as events. The EC 31 is able to decide the operating environment by using an operation signal which is input from the input unit 32, a detection signal which is input from the sensor 33 and so forth. For example, in a case where the operation state of the computer system at that time point is an active state, the EC 31 detects an idle event which serves as a trigger for changing the operation state to an idle state. The active state is a normal operation mode that the information processing apparatus 1 is able to execute an operation that the information processing apparatus 1 is expected to execute. On the other hand, the idle state is a low power consumption mode which is lower in power consumption than the active state. The idle event includes, for example, a situation where a time that the operation signal is not input from the input unit 32 continuously passes for a predetermined time (for example, three to fifteen minutes) or more, a situation where a state (for example, an opening angle between mutually facing surfaces of respective chassis is less than 45° to) 90° where the two chassis (not illustrated) that the information processing apparatus 1 includes are mutually closed is detected on the basis of the detection signal which is input from the sensor 33, a situation where a sleep menu on an OS-based setting screen is selected in accordance with the operation signal and so forth.

On the other hand, in a case where the operation state of the computer system at that time point is the idle state, the EC 31 detects an active event which serves as a trigger for changing the operation state to the active state. The active event includes, for example, a situation where the operation signal is input from the input unit 32, a situation where a state (for example, the opening angle is at least 45° to 90°) where the two chassis (not illustrated) of the information processing apparatus 1 are mutually opened is detected on the basis of the detection signal which is input from the sensor 33, a situation where a depression signal is input in association with depression of a power source button 53 and so forth. The EC 31 outputs event information which indicates the detected event to the PCH 21 and the processor 11 (however, in a case where the PCH 21 and the processor 11 are in operation).

The EC 31 controls the operation of the power source circuit 34 in accordance with the operation state of the computer system (in the present application, simply called the system as the case may be) which configures the information processing apparatus 1. For example, power states which are prescribed in the ACPI (Advanced Configuration and Power Interface) standard are used as the operation state. S0 state to S5 state are defined as the power states of six stages in the ACPI standard. States where the power consumption becomes lower and lower or sleep states which become deeper and deeper in the order of the S0 state to the S5 state are indicated. The deep sleep state is a state where a resume time taken for changing to the active state is long. The S0 state corresponds to the active state and is a state which is the highest in power consumption in the power states of the six stages. The S1 state to the S5 state respectively correspond to the idle states and indicate the states where the power consumption becomes lower and lower or the sleep states which become deeper and deeper in that order. The S4 state corresponds to the existing hibernation state. The hibernation state is a state where the operation of the processor 11 is stopped after saving data (a system context) which indicates work contents and is stored in the system memory 12 into the HDD in a case where the operation mode of the system is directed. However, power supply to the device(s) which is/are used for start-up is continued. Incidentally, the existing sleeping mode corresponds to the S3 state and is also called a suspend mode or a standby mode. The S3 state is a state where power supply to storage media such as the system memory 12 and so forth is continued and the operation of the processor 11 is stopped. The S5 state is a state where the operation of the processor 11 is stopped and power supply to the system memory 12 is stopped. However, even in a case where the state of the system is one of the S1 state to the S5 state, power supply to each of the PCH 21 and the EC 31 is continued and therefore standby power is generated. In the S3 state to the S5 state, a power consumption amount of the PCH 21 may be lower than power consumption amounts in other idle states. In the S3 state to the S5 state, it is sufficient that the power which is necessary for at least waiting for reception of the event information which is input from the EC 31 be supplied to the PCH 21 and the power which is used for the operation of the time counting section 155 is not necessary. In addition, a state which is shifted to the S4 state and the S5 state may be equal to each other in power consumption which is used in the entire system.

The information processing apparatus 1 according to the present embodiment makes the transition among a G0 state, an S0ix state, a G1 state and a G3 state as the operation modes of the entire system possible. In the above-described states, the G0 state, the G1 state and the G3 state correspond to states of three stages in global system states of four stages. The G0 state corresponds to the S0 state as the power state, that is, the active state. The S0ix state, the G1 state and the G3 state correspond to the idle state. The G1 state corresponds to the S3 state or the S4 state as the power state. The G3 state is a stop state where power supply to the information processing apparatus 1 other than the EC 31 and a power supply system is entirely stopped and no standby power is generated. The G3 state is also called a mechanical off-state. In the example illustrated in FIG. 1, the power source circuit 34, an AC/DC (Alternative Current/Direct Current) adopter 51 and a battery unit 52 correspond to the power supply system. Accordingly, the power consumption of the system is lower in the G1 state than in the G0 state. In addition, the resume time taken for changing to the G0 state becomes longer in the G3 state than in the G1 state and, in general, the power consumption of the system is lower in the G3 state than in the G1 state. However, although the resume time becomes longer in the G3 state than in the S4 state depending on the state of the apparatus which operates in the G3 state, the power consumption of the system in the S4 state and the power consumption of the system in the G3 state may become equal to each other. Incidentally, the G2 state corresponds to the S5 state as the power state.

That is, the system may take any of the S0 state (the G0 state), the S4 state (the G1 state), the G3 state and the S0ix state as the operation state. Although the S0ix state is an operation mode obtained by expanding the S0 state, the power consumption is lower in the S0ix state than in the S0 state. However, power supply to the system memory 12 is maintained in the S0ix state. Therefore, although the operation mode is more quickly changed to the normal operation mode in the S0ix state than in the S3 state or the S4 state, the power consumption is higher in the S0ix state than in the S3 state or the S4 state. In addition, it becomes possible for the processor 11 to switch the operation state (in the following, referred to as a processor state) as the processor 11 from the idle state to the active state in the S0ix state in a case of detecting a predetermined trigger event. As the trigger event, in addition to the above-described active event, for example, any of start of execution of a maintenance task, reception of an electronic mail, recognition of a voice command by utterance, user authentication, or an optional combination of the above-described events may be used. In execution of the maintenance task, the processor 11 executes the maintenance task which is directed using a predetermined utility and changes the processor state from the active state to the idle state after termination of execution of the maintenance task. In a case of receiving the electronic mail by executing a predetermined mail app, the processor 11 transmits a request for reception of the electronic mail which is addressed to the information processing apparatus 1 to a predetermined mail server by using the communication module 26. The processor 11 receives a new electronic mail which is addressed to the information processing apparatus as a response to the request for reception of the electronic mail from the mail server and stores the received new electronic mail into the HDD 23. Then, the processor 11 changes the processor state from the active state to the idle state.

In recognition of the voice command, the processor 11 executes a predetermined voice recognition app and waits for reception of voice data which is input from the audio system 25. The processor 11 executes a voice recognition process on the input voice data and decides whether utterance information which is obtained as a result of execution of the voice recognition process is the voice command which is determined in advance. In a case where it is decided that the obtained utterance information is the voice command which is determined in advance, the processor 11 changes the operation state of the information processing apparatus 1 as the system from the S0ix state to the S0 state while maintaining the processor state in the active state. The processor 11 executes a process which is directed with the decided voice command. In user authentication, the processor 11 executes, for example, a predetermined utility so as to collate authentication information which is input from the sensor 33 with user authentication information which is registered in advance. Then, in a case where both the input authentication information and the user authentication information match each other, the processor 11 changes the operation state of the information processing apparatus 1 as the system to the S0 state while maintaining the processor state in the active state. The authentication information may be any of, for example, a fingerprint, the iris, a vain pattern and so forth and a devices (for example, a fingerprint sensor and a camera(s) which photograph(s) the iris and/or the vain pattern) which makes acquisition of the authentication information possible may be included as the sensor 33.

The input unit 32 accepts a user operation, generates an operation signal according to the accepted operation and outputs the generated operation signal to the EC 31. The input unit 32 includes any of pointing devices such as, for example, a keyboard, a touch pad, a mouse and so forth or an optional set of the above-described pointing devices.

The sensor 33 detects the operating environment of the information processing apparatus 1. The sensor 33 includes, for example, a sensor which detects a physical amount which fluctuates in accordance with a mutually opening/closing state of the two chassis of the information processing apparatus 1, an approaching state of the user and so forth as the operating environment. Any of, for example, a magnetic sensor, an acceleration sensor, a stress sensor, an infrared ray sensor, a capacitive sensor and so forth, or a combination of these sensors is used as a sensor to be used for detection of the mutually opening/closing state of the two chassis. The magnetic sensor is installed on one end of one of the two chassis and detects a magnetic field of a permanent magnet which is installed on one end of the other chassis. The mutually opening/closing state of the two chassis is decided in accordance with the magnitude of the magnetic field. The acceleration sensor is installed on each of the two chassis and detects a gravity direction of each of the two chassis. An angle between the two detected gravity directions corresponds to an angle between the two chassis and this angle is used for decision of the mutually opening/closing state of the two chassis. The stress sensor is installed on a hinge section which mutually engages the two chassis and detects a stress which is generated in accordance with the angle between the two chassis. The infrared ray sensor detects an infrared ray of a wavelength which corresponds to a body temperature of a person and detects approach of the person in accordance with the intensity of the detected infrared ray. The capacitive sensor detects an increase in capacitance of a capacitor due to approach of the person and the detected capacitance is used for detection of approach of the person.

The power source circuit 34 performs power supply to each device which configures the information processing apparatus 1 and adjustment of the power to be supplied on the basis of control of the EC 31. The power source circuit 34 is configured by including, for example, a power source control circuit 35, a DC/DC (Direct Current/Direct Current) converter 36, a voltage detector 37 and a charge/discharge unit 38.

A battery housing section (not illustrated) to which the battery unit 52 is detachably attached is provided in the chassis of the information processing apparatus 1. An attachment detection line which is used for detection of attachment of the battery unit 52 is marked on the information processing apparatus 1. The EC 31 is able to detect whether the battery unit 52 is attached to the battery housing section by using the attachment detection line.

The AC/DC adopter 51 is made connectable to a power source terminal which is installed on a surface of the chassis of the information processing apparatus 1. The AC/DC adopter 51 may be integrated with the information processing apparatus 1 by being incorporated into the chassis of the information processing apparatus 1.

The AC/DC adopter 51 is connected to an outlet of a commercial power source at one end and is connected to the DC/DC converter 36 at the other end. The AC/DC adopter 51 converts alternative current power which is supplied from the commercial power source to direct current power and supplies the converted direct current power to the DC/DC converter 36.

In a case where the AC/DC adopter 51 is not connected to the information processing apparatus 1, the battery unit 52 supplies (discharges) the power which is accumulated in the battery unit 52 itself to the DC/DC converter 36 by using the charge/discharge unit 38. The battery unit 52 accumulates (charges) the power which is supplied from the AC/DC adopter 51 by using the charge/discharge unit 38.

The power source control circuit 35 is configured by, for example, an ASIC (Application Specific Integrated Circuit). The ASIC is configured by including passive parts such as a logic circuit, a transistor, a register, a resistor and so forth. Since the power source control circuit 35 is configured only by basic parts without including a processor, the power consumption of the power source control circuit 35 is very low. The voltage detector 37, the DC/DC converter 36, the attachment detection line (not illustrated) and the power source button 53 are connected to the power source control circuit 35.

Operation-state-based power source control information is stored in the register of the power source control circuit 35. Information on the device to be directed as a power supply destination may be included in the power source control information. Information on device-based voltage, current and so forth may be included in the power source control information. In a case where the operation state information which indicates the operation state is input from the PCH 21 or the EC 31, the power source control circuit 35 reads the power source control information which corresponds to the operation state that the operation state information indicates out of the register and outputs the read-out power source control information to the DC/DC converter 36. Therefore, the EC 31 is able to control the operation of the DC/DC converter 36 in accordance with the operation mode by using the power source control circuit 35.

In the S0 state, the power is supplied to all the devices of the information processing apparatus 1. However, in the S0ix state, power supply to the video sub system 13 and the display 14 may be stopped. In the S3 state, further, the power supply to the ROM 22, the HDD 23, the audio system 25 and the communication module 26 may be stopped. In the S4 state and the S5 state, further, the power supply to the system memory 12 may be stopped. In the S4 state and the S5 state, the power supply to the PCH 21, the EC 31, the sensor 33, the power source control circuit 35, the AC/DC adopter 51 and the battery unit 52 may be continued. In the G3 state, the power supply to the devices other than the EC 31 and the power source control circuit 35 is stopped.

The DC/DC converter 36 converts the voltage of the power which is supplied from the AC/DC adopter 51 or the battery unit 52 into a voltage which is requested in each device of the information processing apparatus 1 under the control by the power source control circuit 35. Here, the DC/DC converter 36 supplies the power to the device which is the supply destination which is indicated in the power source control information which is input from the power source control circuit 35. In a case where the device-based voltage information is included in the power source control information, the voltage of the power to be supplied is converted into a voltage which is directed in the power source control information and the power whose voltage is converted is supplied to the corresponding device.

The voltage detector 37 detects the voltage of the power which is supplied from the AC/DC adopter 51 and decides whether the detected voltage is a voltage which falls within a predetermined range. The voltage detector 37 outputs a voltage detection signal which indicates whether the detected voltage is the voltage which falls within the predetermined range to the power source control circuit 35. The power source control circuit 35 records the voltage detection signal which is input from the voltage detector 37 into the register.

The power source button 53 is used by the user so as to turn on/off the power source. The user is able to start the operation mode of the information processing apparatus 1 from the G3 state by operating the power source button 53.

The power source control circuit 35 records a depression signal which indicates depression of the power source button 53 into the register. The EC 31 decides whether the depression signal is present with reference to data in the register. In a case where the EC 31 detects the depression signal when the operation of the information processing apparatus 1 is stopped, the EC 31 reads out power source control information which indicates all the devices of the information processing apparatus 1 as the power supply destinations and outputs the read-out power source control information to the DC/DC converter 36 (start-up). The EC 31 begins start-up of the information processing apparatus 1 (also including the processor 11) and thereafter erases the depression signal which is recorded in the register of the power source control circuit 35. In addition, in a case where the EC 31 detects the depression signal when the information processing apparatus 1 is operating in the normal operation mode, the EC 31 reads out power source control information which indicates stop of power supply to all the devices of the information processing apparatus 1 and outputs the read-out power source control information to the DC/DC converter 36 (stop of the operation).

Figure 2:
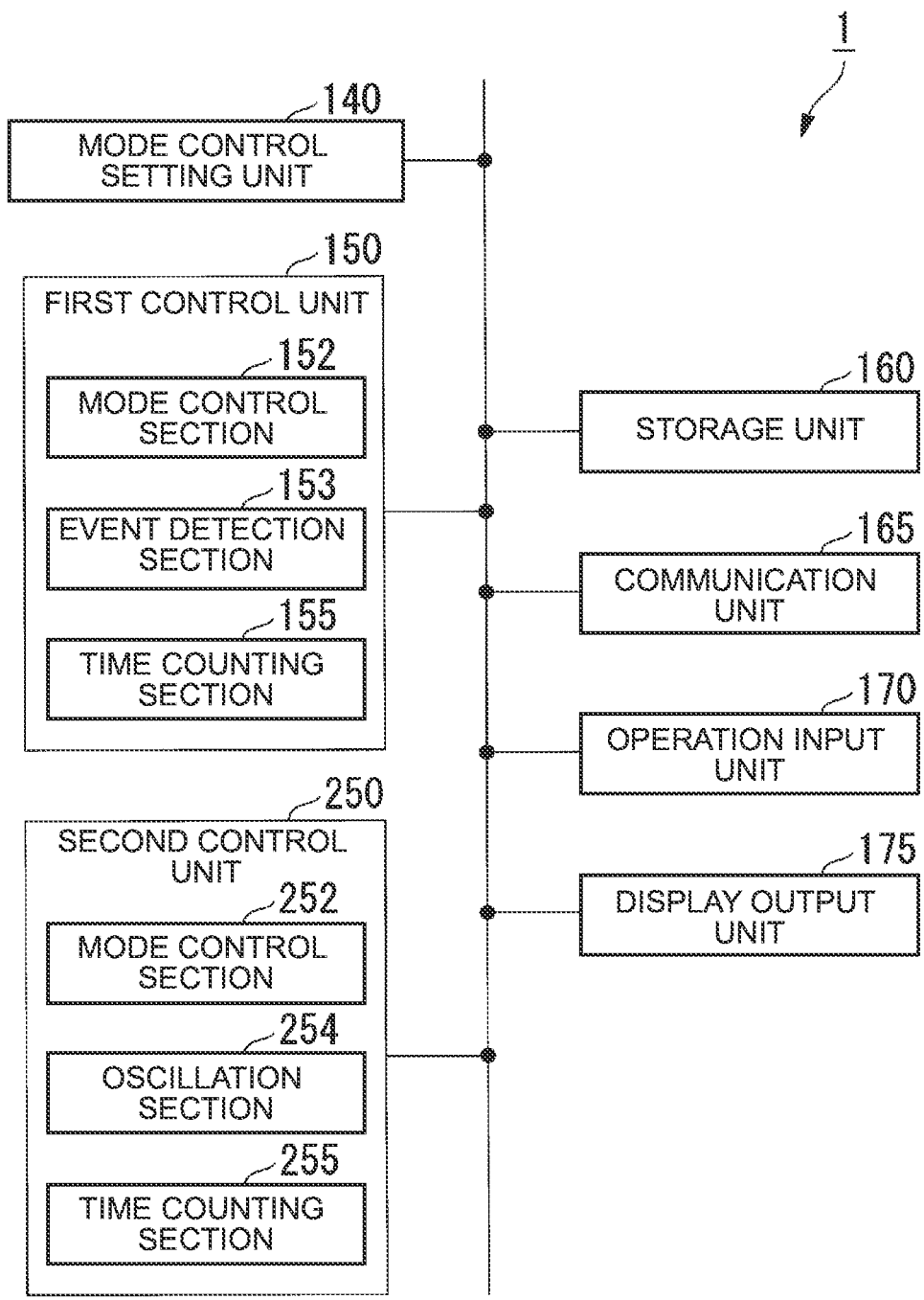
FIG. 2 is a block diagram illustrating one functional configuration example of the information processing apparatus according to the present embodiment.
Figure 3:
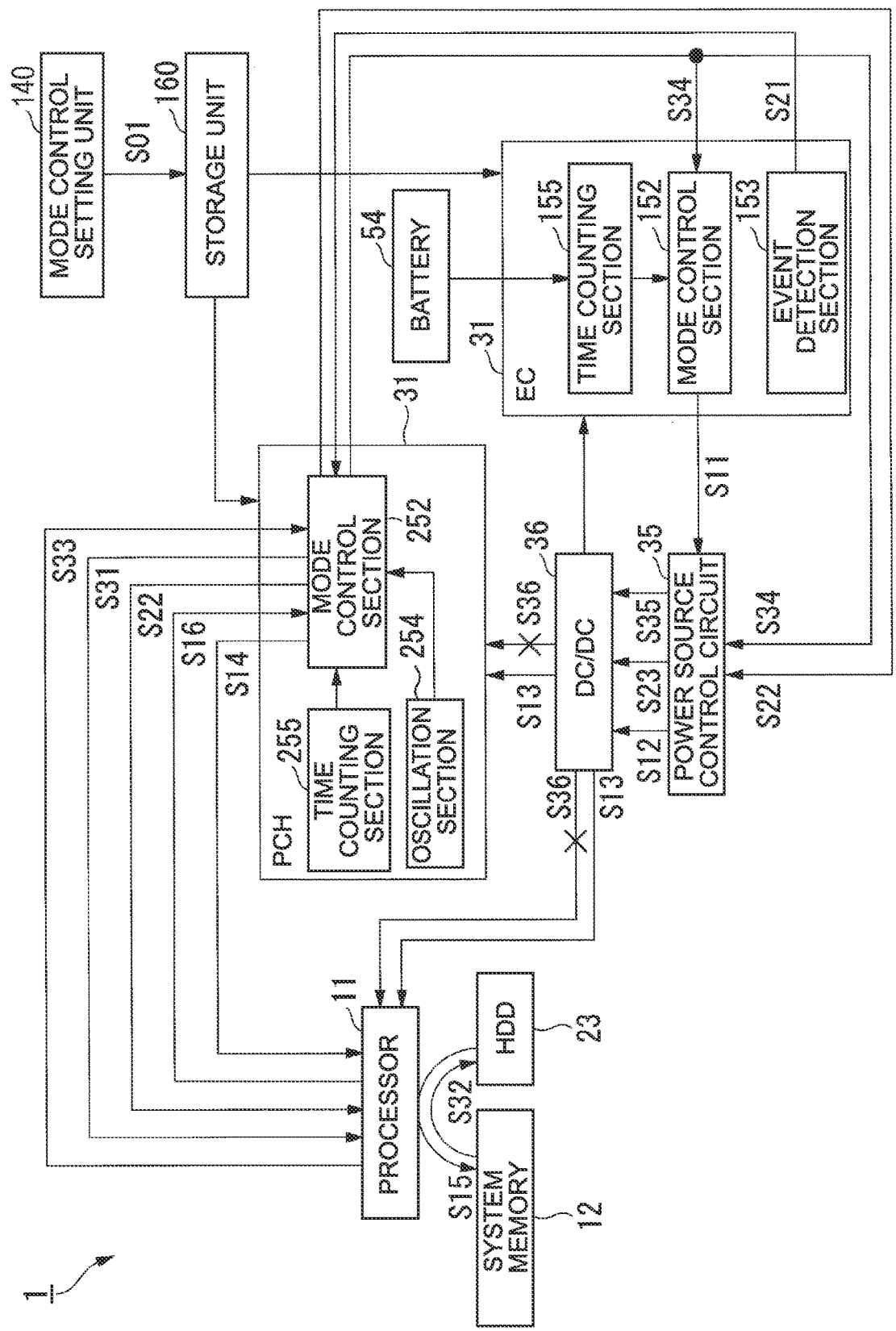
FIG. 3 is a data-flow diagram illustrating one example of mode control pertaining to the present embodiment.

Next, a functional configuration example of the information processing apparatus 1 according to the present embodiment will be described. FIG. 2 is a block diagram illustrating one functional configuration example of the information processing apparatus 1 according to the present embodiment. FIG. 3 is a data-flow diagram illustrating one example of mode control pertaining to the present embodiment. The information processing apparatus 1 is configured by including a mode control setting unit 140, a first control unit 150, a second control unit 250, a storage unit 160, a communication unit 165, an operation input unit 170 and a display output unit 175. The storage unit 160 is configured by including storage media that the PCH 21 and the EC 31 have, in addition to storage media such as the system memory 12, the ROM 22, the HDD 23 and so forth. The communication unit 165 corresponds to the communication module 26. The operation input unit 170 corresponds to the input unit 32. The display output unit 175 corresponds to the display 14.

The processor 11 executes a predetermined program (for example, a utility) and thereby realizes the function of the mode control setting unit 140.

The mode control setting unit 140 sets setting information relating to the Smart Standby function as mode control setting information. For example, use and disuse of the Smart Standby function and a scheduled use time of the information processing apparatus 1 are included in the mode control setting information. The Smart Standby function is a function of controlling the operation state to the S0ix state in a partial term which is included in the scheduled use time which is set in advance in a term that the operation state of the system is the idle state and controlling the operation state to the S4 state or the G3 state in a term other than the scheduled use time. That is, in a case where the Smart Standby function is valid, as long as a start-up event is not detected, the operation state is maintained in the S0ix state in the scheduled use time so as to avoid transition to the S4 state or the G3 state and thereby a function of maintaining and managing the information processing apparatus 1 such as a maintenance function and so forth works continuously. In the present embodiment, the operation state is controlled to the G3 state in the term other than the scheduled use time.

The scheduled used time is defined on the basis of a scheduled use start time of day and a scheduled use end time of day. The scheduled use time is a time zone that use of the information processing apparatus 1 is scheduled in a day. The mode control setting unit 140 reads out, for example, mode control setting screen data which is stored in the storage unit 160 in advance and makes the display output unit 175 display a mode control setting screen which is based on the read-out mode control setting screen data.

Figure 4:
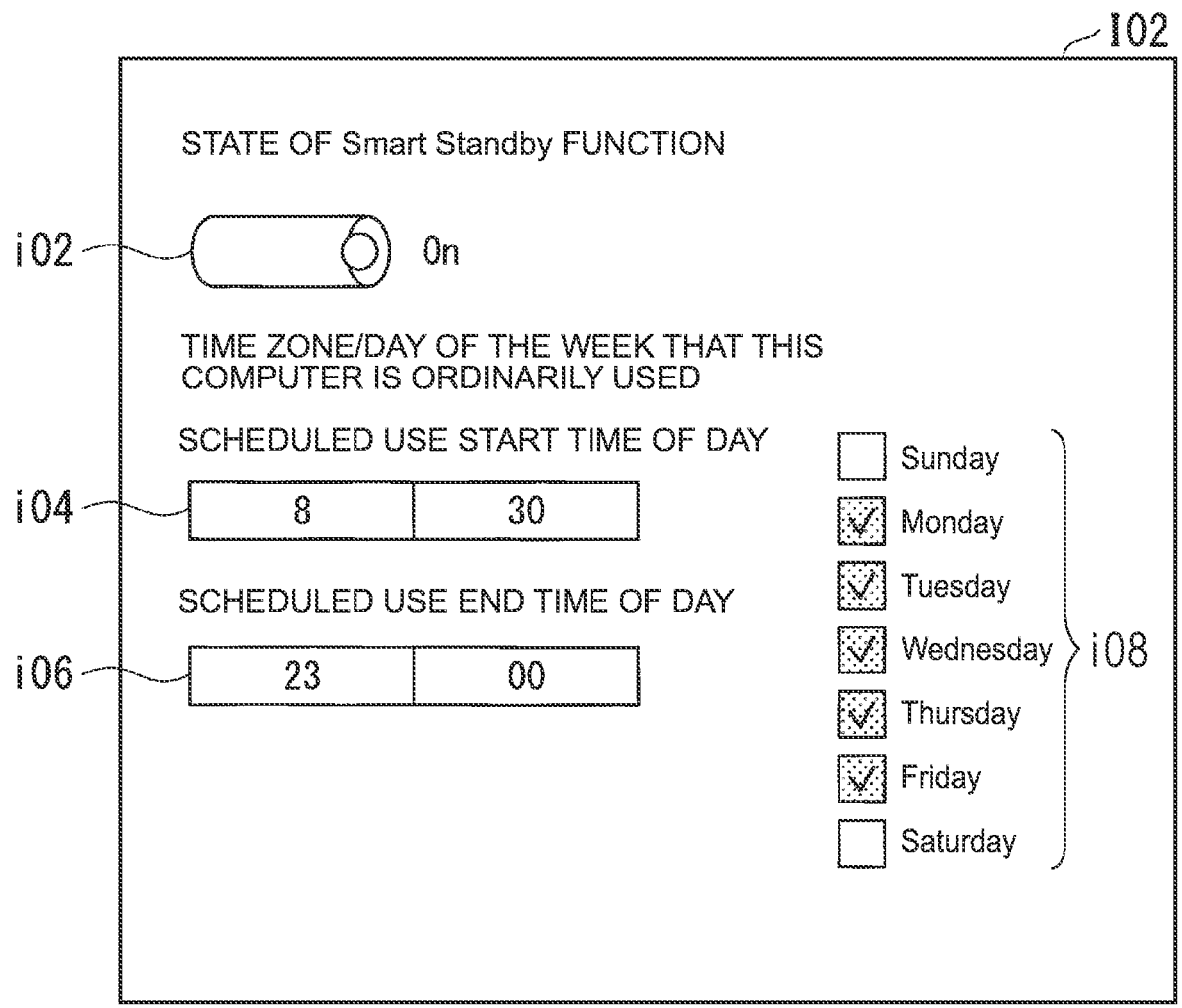
FIG. 4 is a diagram illustrating one example of a mode control setting screen pertaining to the present embodiment.

It is possible to set the mode control setting information on a mode control setting screen 102 which is illustrated in FIG. 4 in accordance with the user operation using the operation input unit 170. It is possible to set use/disuse of the Smart Standby function and a day of the week that the scheduled use start time of day, the scheduled used end time of day and the scheduled use time are set by operating a switch i02, an input window i04, an input window i06 and a check box i08 respectively.

The mode control setting unit 140 stores mode control setting information which is indicated with an operation signal which is input from the operation input unit 170 into the storage unit 160 (FIG. 3, S01).

Incidentally, the mode control setting unit 140 may determine the scheduled use start time of day with reference to operation logs which are stored in the storage unit 160 and on the basis of a use start time of day which is a time of day that the operation state of the information processing apparatus 1 is changed from the idle state to the active state for the first time at daily intervals. The mode control setting unit 140 determines, for example, a time of day which is the earliest in use start times of day in a predetermined term (for example, four weeks to one year) till that day as the scheduled use start time of day. In addition, the mode control setting unit 140 may determine the scheduled use end time of day with reference to the operation logs and on the basis of a use end time of day which is a time of day that the operation state is finally changed from the active state to the idle state at daily intervals. The mode control setting unit 140 determines, for example, a time of day which is the latest in use end times of day in the predetermined term till that day as the scheduled use end time of day.

The operation logs are produced by accumulating pieces of stored operation mode information. Mode control sections 152 and 252 each store a time of day obtained at least every time the operation mode is changed and the operation mode information which indicates the changed operation mode into the storage unit 160.

Returning to FIG. 2, the EC 31 executes a predetermined program and thereby realizes the functions of the mode control section 152, the event detection section 153 and the time counting section 155. The PCH 21 executes a program which is different from the program that the EC 31 executes and thereby realizes the functions of the mode control section 252, the oscillation section 254 and the time counting section 255.

First, processes of respective units and sections will be described by exemplifying a case where the operation state of the system transitions from the G3 state to the S0ix state when information which indicates use of the Smart Standby function (Smart Standby ON) is included in the mode control setting information.

In a case where the operation state is the G3 state, the mode control section 152 waits for reception of scheduled use start time-of-day information which indicates that the current time of day reaches the scheduled use start time of day after the lapse of the term other than the scheduled time of use from the time counting section 155. In a case where the scheduled use start time-of-day information is input, the mode control section 152 outputs operation state information which directs the S4 state as the operation state to the power source control circuit 35 (FIG. 3, S11).

The time counting section 155 is configured by including a timer of the EC 31 and the timer counts the current time of day. The time counting section 155 decides whether the current time of day reaches the scheduled use start time of day after the lapse of the term other than the scheduled use time with reference to mode transition setting information. In a case where it is decided that the current time of day reaches the scheduled use start time of day, the time counting section 155 outputs the scheduled use start time-of-day information to the mode control section 152.

The power source control circuit 35 outputs power source control information which corresponds to the S0ix state to the DC/DC converter 36 as the operation state that the operation state information which is input from the mode control section 152 indicates (FIG. 3, S12).

The DC/DC converter 36 supplies the power to the devices which are directed in the power source control information which is input from the power source control circuit 35 (FIG. 3, S13). In this case, power supply to the processor 11, the system memory 12, the PCH 21, the ROM 22, the HDD 23, the audio system 25 and the communication module 26 is resumed. Incidentally, power supply to the EC 31 is maintained.

In association with start of power supply, the PCH 21 operates so as to start the operations of at least the mode control section 252, the oscillation section 254 and the time counting section 255.

The oscillation section 254 generates a clock signal whose amplitude vibrates in a constant period and outputs the generated clock signal to the time counting section 255.

The time counting section 255 is configured by including a timer which counts the current time of day by using a frequency-divided signal which is obtained by dividing the frequency of the clock signal which is input from the oscillation section 254 at a predetermine division ratio. The time counting section 255 decides whether the current time of day reaches the scheduled use end time of day in a case where the current time of day is included in the scheduled use time with reference to the mode transition setting information. In a case where it is decided that the current time of day reaches the scheduled use end time of day, the time counting section 255 outputs the scheduled use end time-of-day information to the mode control section 252.

At the completion of start-up of the processor 11, the system state transitions to the S4 state. In this case, the mode control section 252 outputs a start-up control signal which indicates start-up of the processor 11 to the processor 11 (FIG. 3, S14). Accordingly, although the time of day that the time counting section 155 counts is used in transition from the G3 state to the S0ix state, the mode control section 252 resumes monitoring of the scheduled use end time-of-day information which is input from the time counting section 255 and resumes decision of whether transition from the S0ix state to the G3 state is necessary. That is, in a case of deciding whether transition from the S0ix state to the G3 state is necessary, a time of day that the time counting section 255 counts is used as a control base time.

In a case where the start-up control signal is input from the control section 216 of the PCH 21 into the processor 11, the processor 11 starts up. The processor 11 reads the system context which is saved in advance into the HDD 23 out of the HDD 23 and loads the read-out system context to the system memory 12 (FIG. 3, S15). Then, the processor 11 outputs change completion information which indicates completion of change of the operation mode to the mode control section 252 (FIG. 3, S16). At this stage, the operation state of the system transitions to the S0ix state. The processor 11 resumes execution of a process that the processor 11 executed immediately before changing the operation state from the S0ix state to the G3 state in the past.

Next, transition of the operation state between the active state (the S0 state) and the idle state (the S0ix state) will be described.

The event detection section 153 detects an active event or an idle event according to a state of the user operation or the operating environment of the information processing apparatus 1 as described above. The event detection section 153 outputs event information which indicates the detected event to the mode control section 252 (FIG. 3, S21).

In a case where the current operation state is the S0ix state and the event information which indicates the active event is input from the event detection section 153, the mode control section 252 decides to change the operation state to the S0 state and outputs operation state information which indicates the S0 state to the processor 11 and the power source control circuit 35 (FIG. 3, S22).

In a case where the current operation state is the S0 state and event information which indicates the idle event is input from the event detection section 153, the mode control section 252 decides to change the operation state of the system to the S0ix state and outputs operation state information which indicates the S0ix state to the processor 11 and the power source control circuit 35 (FIG. 3, S22).

In a case where when the operation state of the system is the S0 state, the operation mode information which indicates the S0ix state is input from the mode control section 252, the processor 11 sets upper limit power consumption which is set as an upper limit value of the power consumption to a predetermined value of the upper limit power consumption in the S0ix state which is lower than upper limit power consumption in the S0 state. In a case where when the operation state of the system is the S0ix state, the operation mode information which indicates the S0 state is input from the mode control section 252, the processor 11 sets the upper limit power consumption to a predetermined value in the S0 state.

The power source control circuit 35 reads power source control information which corresponds to the operation mode which is directed in the operation mode information which is input from the mode control section 252 out of the register and outputs the read-out power source control information to the DC/DC converter 36 (FIG. 3, S23). The DC/DC converter 36 supplies the power to the device which is directed in the power source control information which is input from the mode control section 252.

In a case where the operation state is to be changed from the S0ix state to the S0 state, the power supply to the processor 11 and the system memory 12 is continued and the power supply to the video sub system 13 and the display 14 is resumed (not illustrated). In a case where the operation state is to be changed from the S0 state to the S0ix state, the power supply to the processor 11 and the system memory 12 is continued and the power supply to the video sub system 13 and the display 14 is stopped (not illustrated).

Incidentally, processes that respective units and sections execute will be described by exemplifying a case where when information which indicates use of the Smart Standby function (Smart Standby ON) is included in the mode control setting information, the operation state of the system transitions from the S0ix state to the G3 state.

The mode control section 252 decides whether the current time of day that time-of-day information which is input from the time counting section 255 indicates is included in the scheduled use time with reference to the mode transition setting information which is stored in the storage unit 160. In a case where the mode control section 252 decides that the current time of day reaches the scheduled use end time of day from the time of day in the scheduled use time, the mode control section 252 changes the operation mode to the G3 state. The mode control section 252 outputs the operation mode information which indicates the G3 state as the operation mode to the processor 11 (FIG. 3, S31).

In a case where the operation mode information which indicates the G3 state is input from the mode control section 152, the processor 11 stops execution of a process which is being executed and saves the system context which is stored in the system memory 12 into the HDD 23 (FIG. 3, S32). Then, the processor 11 outputs preparation completion information which indicates completion of preparation for change of the operation mode to the mode control section 252 (FIG. 3, S33). At this stage, the operation state of the system transitions to the S4 state.

In a case where the preparation completion information is input from the processor 11, the mode control section 252 outputs the operation mode information which indicates the G3 state as the operation mode to the mode control section 152 and the power source control circuit 35 (FIG. 3, S34). The mode control section 152 resumes monitoring of the scheduled use start time-of-day information which is input from the time counting section 155 and resumes decision of whether transition from the G3 state to the S0ix state is necessary. That is, in a case of deciding whether transition from the G3 state to the S0ix state is necessary, the time of day that the time counting section 155 counts is used as the control base time.

The power source control circuit 35 outputs the power source control information to the DC/DC converter 36 in accordance with the operation mode which is directed in the operation mode information which is input from the mode control section 152 (FIG. 3, S35). The DC/DC converter 36 continues the power supply to the device which is directed in the power source control information which is input from the mode control section 152 and stops the power supply to other devices, that is, the processor 11, the system memory 12, the PCH 21, the ROM 22, the HDD 23, the audio system 25 and the communication module 26 (FIG. 3, S36). At this stage, the operation state of the system transitions to the G3 state.

Incidentally, in a case of deciding whether state-to-state transition from one state other than the G3 state to another state is necessary, the mode control section 252 may use the current time of day which is counted by the timer of the EC 31 in place of the current time of day which is counted by the time counting section 255. The state-to-state transition from one state other than the G3 state to another state the necessity of which is decided by the mode control section 252 includes the above-described transition from the S0ix state to the G3 state and transition between the S0 state and the S0ix state which will be described later. For example, in a case of making the operation state transition from the S0ix state once to the S3 state and then to the G3 state, the time counting section 155, in place of the time counting section 255, decides whether the current time of day reaches the scheduled use end time of day when the current time of day is included in the scheduled use time and outputs the scheduled use end time-of-day information to the mode control section 252 when deciding that the current time of day reaches the scheduled use end time of day. This is because in a case where the accuracy of the current time of day which is counted by the timer of the EC 31 is high, continuous use of the current time of day causes no particular trouble. In addition, in the above-mentioned case, the mode control section 252 may be omitted in the PCH 21 and the mode control section 152 which functions in the EC 31 may decide whether the state-to-state transition from one state other than the G3 state to another state is necessary on the basis of the current time of day which is counted by the timer of the EC 31. Here, the mode control section 152 may execute processes in S14, S22, S31 and S33 in place of the mode control section 252. In addition, the processor 11 may set the mode control section 152 as the destination to which the change completion information is output in S33.

Incidentally, in a case where the operation state of the system is the G3 state, the mode control section 152 may decide whether a predetermined start-up event is detected. In a case of detecting the predetermined start-up event, the mode control section 152 may change the operation state to the S0 state without once changing to the S0ix state. The mode control section 152 outputs operation state information which indicates the S0 state as the operation state to the power source control circuit 35. The power source control circuit 35 reads the power source control information which corresponds to the S0 state as the operation mode which is directed in the operation mode information which is input from the mode control section 152 out of the register and outputs the read-out power source control information to the DC/DC converter 36. The DC/DC converter 36 supplies the power to the device which is directed in the power source control information which is input from the mode control section 152. In this case, further, the DC/DC converter 36 resumes the power supply also to the video sub system 13 and the display 14. Thereafter, the processor 11 executes the process in the above-mentioned S15 (FIG. 3).

Next, control examples of the operation state pertaining to the present embodiment will be described.

Figure 5:
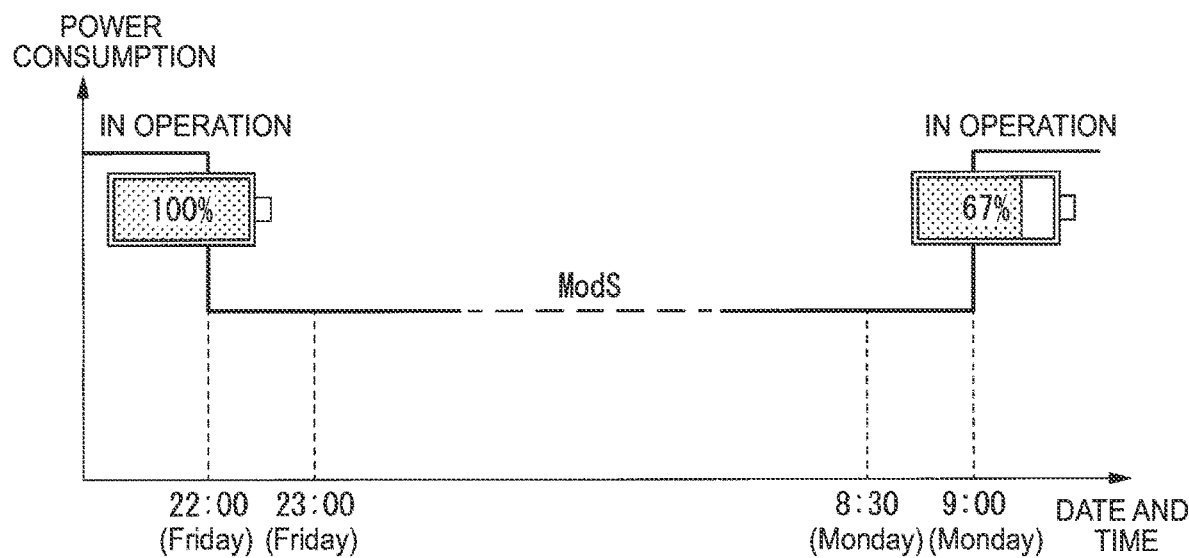
FIG. 5 is a diagram illustrating one control example of an existing operation mode.
Figure 6:
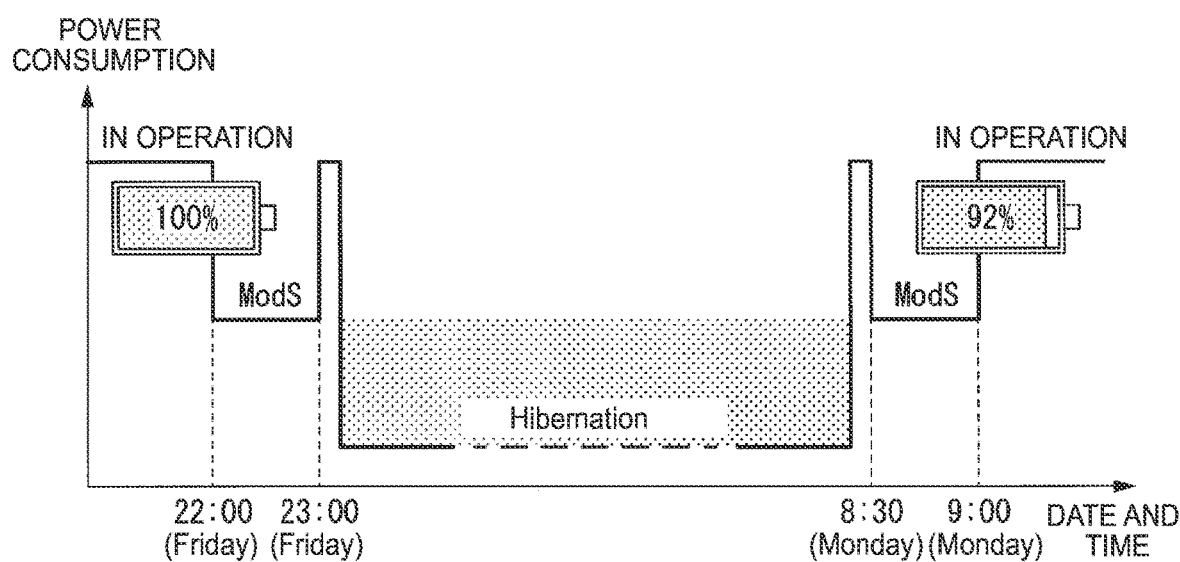
FIG. 6 is a diagram illustrating another control example of the existing operation mode.
Figure 7:
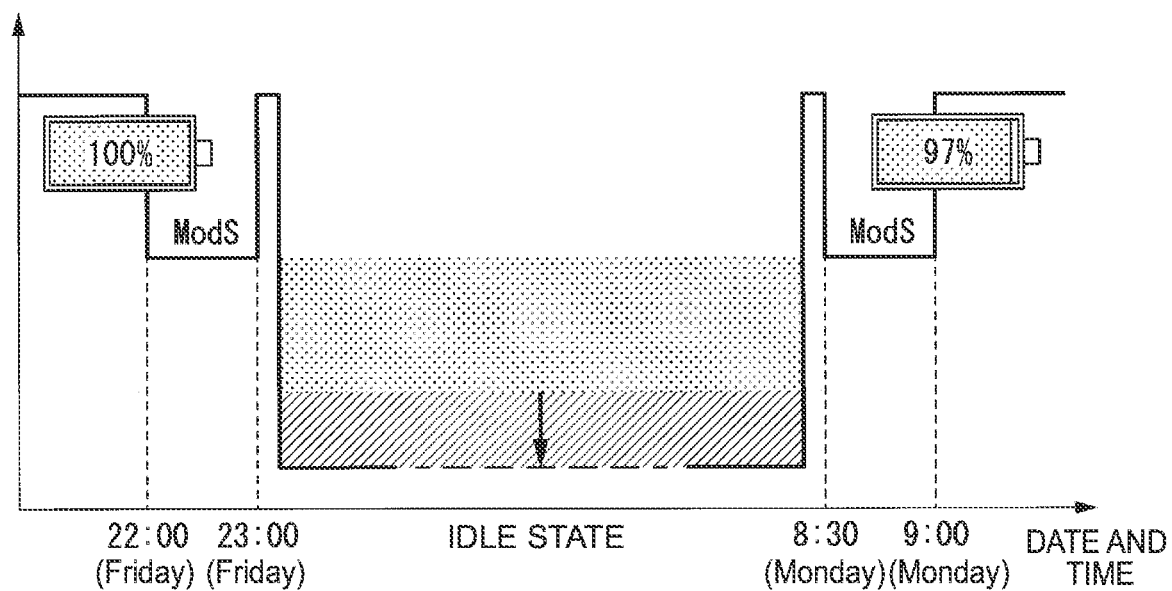
FIG. 7 is a diagram illustrating one control example of an operation mode pertaining to the present embodiment.

FIG. 5 to FIG. 7 are diagrams illustrating the control examples of the operation state. FIG. 5 to FIG. 7 each illustrate the operation state which is set from Friday afternoon of a certain week till Monday morning of the next week. The vertical axis and the horizontal axis indicate the power consumption and the date and time respectively. Cases where in a term till 22:00 on Friday, the operation state is the active state (the S0 state, in operation) in all the examples and in a term from 22:00 on Friday till 8:30 on Monday, the operation state is the idle state (the S0ix state: ModS, the S4 state: the hibernation state or the G3 state) are exemplified in FIG. 5 to FIG. 7.

In FIG. 5, a case where the Smart Standby function is not used is exemplified. The operation state is the active state till 22:00 on Friday, is the S0ix state from 22:00 on Friday till 9:00 on Monday and then transitions to the active state after 9:00 on Monday. Although, the power consumption in the S0ix state becomes lower than the power consumption in the active state, in a case where a battery capacity at 22:00 on Friday is 100%, the battery capacity at 9:00 on Monday that use of the computer system is resumed becomes 67%. The battery capacity is a relative value obtained in a case where electric energy which is accumulated when the battery unit 52 is fully charged is defined as 100%.

In the example illustrated in FIG. 6, the existing Smart Standby function is used and the scheduled use time is set to a term from 8:30 till 23:00 on each day from Monday till Friday. However, in the example in FIG. 6, the operation state transitions from the S0ix state to the S4 state at 23:00 on Friday. At the time point that the operation state transitions to the S4 state, the power consumption is temporarily increased and becomes almost equivalent to the power consumption in the active state. Immediately after temporary increase, the power consumption is rapidly reduced. In the S4 state (the Hibernation state), the power consumption becomes lower than the power consumption in the S0ix state. In a case where the battery capacity at 22:00 on Friday is 100%, the battery capacity at 9:00 on Monday that use of the computer system is resumed becomes 92%.

In the example illustrated in FIG. 7, the Smart Standby function pertaining to the present embodiment is used and the scheduled use time is set to a term from 8:30 till 23:00 on each day from Monday till Friday. The operation state transitions from the S0ix state to the G3 state at 23:00 on Friday. At the time point that the operation state transitions to the G3 state, the power consumption is temporarily increased and becomes almost equivalent to the power consumption in the active state. Immediately after temporary increase, the power consumption is rapidly reduced. In the G3 state (the idle state), the power consumption becomes lower than the power consumption in the S0ix state. The operation state transitions from the G3 state to the S0ix state at 8:30 on Monday. At a time point that the operation state transitions to the S0ix state, the power consumption is temporarily increased and becomes almost equivalent to the power consumption in the standard operation mode. Immediately after temporary increase, the power consumption is rapidly reduced.

However, in the S4 state illustrated in FIG. 6, the time counting section 255 that the PCH 21 includes is used as the timer which counts the current time of day. A meshed part indicates a difference between the power consumption in the S0ix state and the power consumption in the existing S4 state. In a case where the battery capacity at 22:00 on Friday is 100%, the battery capacity at 9:00 on Monday that use of the computer system is resumed becomes 92%.

On the other hand, in the G3 state illustrated in FIG. 7, the time counting section 155 that the EC 31 includes is used as the timer which counts the current time of day. A diagonally-right-up-line part indicates a difference between the power consumption in the existing S4 state and the power consumption in the G3 state pertaining to the present embodiment. The power consumption in the G3 state pertaining to the present embodiment is typically reduced to about 20 mW which is almost ⅓ of the power consumption (typically, about 60 mW) in the existing S4 state. In a case where the battery capacity at 22:00 on Friday is 100%, the battery capacity at 9:00 on Monday that use of the computer system is resumed becomes 97%. In the present embodiment, in a case where the operation state of the computer system is the idle state in the term other than the scheduled use time, it becomes possible to promote a further reduction in power consumption by changing the operation state to the G3 state in this way. Although the resume time taken for changing from the G3 state to the active state is longer than the resume time taken for changing from the S4 state to the active state, in the present embodiment, the transition from the G3 state to the S0ix state is made at start of the scheduled used time. Therefore, at start of real use of the information processing apparatus 1, the transition from the S0ix state to the S0 state which is relatively short in resume time is presented to the user and thereby it becomes possible to avoid such a situation that the user experiences the long resume time to the greatest possible extent.

Incidentally, although in the above-mentioned examples, a case where it is possible to set daily or weekly scheduled use end time of day and scheduled use start time of day as a first transition time of day that the state of the system is made to transition from the S0ix state to the G3 state and a second transition time of day that the state of the system is made to transition from the G3 state to the S0ix state is described, time setting is not limited to the above-described case. Periods of the settable first transition time of day and second transition time of day may be different periods, for example, periods which are longer than the above such as ten days, one month and so forth, and periods which are shorter than the above such as the morning or the afternoon individually, six hours and so forth. In addition, the settable first transition time of day and second transition time of day may not be periodic and may be temporary (only once). In addition, the first transition time of day and the second transition time of day may be individually settable and either the first transition time of day or the second transition time of day may not be set.

In addition, the time of day that each of the time counting section 155 and the time counting section 255 counts may not necessarily be the predetermined standard time, a standard time which is set as the reference may be changeable by the user operation and a time of day which is set as the time-counting starting point may be optionally changeable.

Incidentally, the information processing apparatus 1 may include a battery holder to which a battery 54 is attached. In a case where the power is not supplied from the DC/DC converter 36 to the EC 31, the time counting section 155 may count the current time of day by consuming the power which is supplied from the battery 54. For example, a case where the operation state is the G3 state, a case where the AC/DC adopter 51 and the battery unit 52 in which sufficient power is accumulated are not connected to the information processing apparatus 1 and so forth are given as the case where the power is not supplied from the DC/DC converter 36 to the EC 31. The battery 54 is, for example, a lithium battery.

As described above, the information processing apparatus 1 according to the present embodiment includes the computer system which is able to make the transition between the active state and the idle state and in which the idle state is the state which is lower in power consumption than the active state and is the power mode of at least any of the first low power consumption mode (for example, the S0ix state), the second low power consumption mode (for example, the S4 state) which is longer than the first low power consumption mode in resume time taken for changing to the active state and the third low power consumption mode (for example, the G3 state) which is lower in power consumption than the second low power consumption mode. The computer system includes a first controller (for example, the EC 31) which is in the active state regardless of whether the state of the computer system concerned is the active state or the idle state. In addition, the computer system includes a second controller which is in the active state in a case where the state of the computer system concerned is the active state, the first low power consumption mode or the second low power consumption mode and is in the idle state in a case where the state of the computer system is the third low power consumption mode. Then, the first controller is able to count a first time of day and changes the state of the computer system to the first low power consumption mode in a case where the state of the computer system is the third low power consumption mode and the counted time of day reaches a predetermined transition time of day (for example, the scheduled use start time of day).

According to the above-described configuration, it becomes possible to monitor a timing of changing the third low power consumption mode to the first low power consumption mode by using the time counting section 155 that the EC 31 includes and therefore it becomes possible to more reduce the power consumption in the third low power consumption mode than a case of using the time counting section that the PCH 21 includes.

In addition, the second controller is able to count a second time of day independently of the first time of day that the first controller counts and makes the state of the computer system transition from the first low power consumption mode to the second low power consumption mode by using the second time of day as a control base time which is the time of day used for controlling the state of the computer system. Then, the second controller may make the state of the computer system transition to the third low power consumption mode after changing the control base time from the second time of day to the first time of day.

According to the above-described configuration, while the state of the computer system and the state of the second controller are being set to the active states, time counting by the second controller which is high in power consumption is stopped and control of the state of the computer system is handed over to the first controller. Therefore, a reduction in power consumption is promoted without hindering the user's experience.

In addition, the second low power consumption mode and the third low power consumption mode may be operation modes that the operation of a processor (for example, the processor 11) that the computer system has is stopped respectively.

According to the above-described configuration, before transition to the third low power consumption mode, the operation of the second controller is stopped in addition to stop of the operation of the processor and after start of the first low power consumption mode, the second controller operates. Accordingly, in a term (for example, the scheduled use time) that the operation state transitions to the first low power consumption mode, the system state rapidly transitions to the active state in accordance with the start-up event by the user operation and so forth.

In addition, the second controller may control data input and output using other devices (for example, the input/output connector 24, the audio system 25 and the communication module 26) and the first low power consumption mode may be an operation mode that the second controller makes it possible to input and output data of the above-described other devices.

According to the above-described configuration, execution of minimum processes in association with data input and output in the first low power consumption mode such as, for example, start-up control with uttered voices, reception of the electronic mails, reception of various downloaded files and so forth becomes possible.

In addition, the first controller may operate so as to start up the second controller in a case where the time of day reaches a predetermined second transition time of day (for example, the scheduled use start time of day) which is different from the first transition time of day and the second controller may operate so as to start up the processor after completion of its own start-up.

According to the above-described configuration, in a case where the operation mode is to be changed from the first low power consumption mode to the second low power consumption mode, the processor 11 starts up after completion of start-up of the second controller. The processor 11 is able to start up in synchronization with the operation of the second controller such as, for example, data input and output at an accurate time of day.

In addition, the second controller may be configured to be able to control data input and output which is faster than data input and output by the first controller. Thereby, in the third low power consumption mode, it becomes possible to reduce the power consumption used for realization of fast data input and output by stopping the operation of the second controller and it becomes possible to start up the processor 11 with a high timewise accuracy when operating the second controller.

Although the embodiment of the present invention was described in detail with reference to the drawings as above, the specific configurations of the present invention are not limited to the above-described embodiment and also designs and so forth which fall within a range not deviating from the gist of the present invention are included. It is possible to optionally combine the respective configurations which are described in the above-mentioned embodiment with one another.

The invention claimed is:

1. An information processing apparatus comprising:
a computer system which is configured to transition between an active state and an idle state, wherein the idle state is lower than the active state in power consumption and is a power mode of at least any one of a first low power consumption mode, a second low power consumption mode which is longer than the first low power consumption mode in resume time for returning to the active state, and a third low power consumption mode which is lower than the second low power consumption mode in power consumption, wherein:
the computer system includes
a first controller which is in an active state regardless of whether a state of the computer system is the active state or the idle state, and
a second controller which is in an active state when the state of the computer system is the active state, the first low power consumption mode, or the second low power consumption mode; and is in an idle state when the state of the computer system is the third low power consumption mode, and
the first controller is configured to:
count a first time of day, and
change the state of the computer system to the first low power consumption mode when the state of the computer system is the third low power consumption mode and the first time of day reaches a predetermined first transition time of day.

2. The information processing apparatus according to claim 1, wherein:
the second controller is configured to:
count a second time of day independently of the first time of day,
use the second time of day as a control base time which is a time of day used to control the state of the computer system, and
when the state of the computer system transitions from the first low power consumption mode to the second low power consumption mode, changes the control base time from the second time of day to the first time of day and thereafter changes the state of the computer system to the third low power consumption mode.

3. The information processing apparatus according to claim 1, wherein:
the second low power consumption mode and the third low power consumption mode are operation modes that a processor stops an operation of the computer system.

4. The information processing apparatus according to claim 3, wherein:
the second controller is configured to control input and output of data using other devices, and the first low power consumption mode is an operation mode that the second controller inputs and outputs the data.

5. The information processing apparatus according to claim 4, wherein:
the first controller starts up the second controller when the first time of day reaches a predetermined second transition time of day which is different from the first transition time of day, and
the second controller starts up the processor after completion of its own start-up.

6. The information processing apparatus according to claim 4, wherein:
the second controller is configured to control data input and output faster than data input and output by the first controller.

7. A controlling method of an information processing apparatus that comprises:
a computer system configured to make a transition between an active state and an idle state, wherein the idle state is lower than the active state in power consumption and is a power mode of at least any one of a first low power consumption mode, a second low power consumption mode which is longer than the first low power consumption mode in resume time for returning to the active state; and a third low power consumption mode which is lower than the second low power consumption mode in power consumption, wherein:
the computer system includes:
a first controller which is in an active state regardless of whether a state of the computer system is the active state or the idle state, and
a second controller which is in an active state when the state of the computer system is the active state, the first low power consumption mode or the second low power consumption mode, and is in an idle state when the state of the computer system is the third low power consumption mode, the method comprising:
changing the state of the computer system to the first low power consumption mode by the first controller when the state of the computer system is the third low power consumption mode and a time of day that the first controller counts reaches a predetermined transition time of day.

\* \* \* \* \*